United States Patent

Ostroff et al.

[15] 3,667,049

[45] May 30, 1972

[54] RADIO FREQUENCY PULSE TRANSMITTER

[72] Inventors: Nathaniel S. Ostroff, Perkasie; Willie Rose, North Wales, both of Pa.

[73] Assignee: Acrodyne Industries, Incorporated, Willow Grove, Pa.

[22] Filed: Oct. 30, 1970

[21] Appl. No.: 85,566

[52] U.S. Cl. ............................325/164, 178/66 A, 325/141, 325/170, 325/181, 332/9

[51] Int. Cl. ........................................H03k 7/00, H04b 1/04

[58] Field of Search..................325/120, 121, 123, 139, 140, 325/141, 142, 143, 144, 164, 170, 181, 182, 187; 332/9, 37, 38; 178/66 A, 68

[56] References Cited

UNITED STATES PATENTS 3,177,431 4/1965 Ashley..................................325/141

*Primary Examiner*—Robert L. Richardson
*Assistant Examiner*—Kenneth W. Weinstein
*Attorney*—Smith, Harding, Earley and Follmer

[57] ABSTRACT

In a pulse transmitter for airborne distance measuring equipment, the final stage of a two-stage RF amplifier is modulated by a primary modulating pulse having a gradual rise and decay, and the drive stage is modulated by a secondary modulating pulse which envelopes the primary modulating pulse in time so that the final stage has adequate drive before the primary modulating pulse occurs.

11 Claims, 2 Drawing Figures

INVENTORS
NATHANIEL S. OSTROFF
& WILLIE ROSE
BY
Smith Harding Earley & Follmer
ATTORNEYS

RADIO FREQUENCY PULSE TRANSMITTER

BRIEF SUMMARY OF THE INVENTION

This invention relates to radio frequency pulse transmitters and particularly to pulse transmitters of the type used in airborne distance measuring equipment.

In short-range navigation systems of which the TACAN (TACtical Air Navigation) system is typical, transmitting equipment aboard an aircraft is used to generate a pulse or group of pulses which are received by a ground station and re-transmitted back to the aircraft after an accurately calibrated delay. The time duration between the initial transmission and the reception of the re-transmitted pulses determines the distance between the aircraft and the ground station. The frequencies typically used are in the 960 – 1,215 MHz range.

It is desirable and, in fact necessary in order to meet military specifications, to avoid sharp rises and falls resulting in undesired frequency components; to produce an RF pulse having a gradual rise and decay. It is desirable also, in order to obtain optimum efficiency, to use a common base RF amplifier, operated class C as a final amplifier stage. However the transfer characteristic of a class C common base amplifier is not strictly linear, and is such that a certain minimum emitter drive is necessary before any collector signal is provided. Thus, when two or more RF stages, including the class C final amplifier are cascaded, and are pulse modulated by the same pulse, the lower parts of the rise and fall of the pulse are removed resulting in a sharp rise and fall characteristic. This problem is inherent in some other types of amplifiers as well, and the class C common base amplifier is only intended to be illustrative.

In accordance with this invention, a trigger pulse generator, which is typically but not necessarily a device for generating pairs of pulses, drives an amplifier, the output of which is shaped and delayed by a multiple-stage filter and used to modulate the final RF amplifier. The same trigger pulses are fed to amplifying and stretching circuitry including a monostable multivibrator, and the output of the amplifying and stretching circuitry is connected through a shaping network to modulate an RF driver. The parameters of the delay circuitry and of the stretching circuitry are chosen so that the pulse which modulates the driving circuitry begins prior to the pulse which modulates the final RF amplifier and ends afterwards. In this way, adequate drive for the final RF amplifier is assured when the final amplifier is keyed by its modulating pulse, and sharp rises and falls of the RF output pulse are avoided.

The principal object of this invention, therefore, is to provide modulating circuitry for an RF pulse transmitter which prevents sharp rises and falls in the RF pulse output, and which gives rise to a smoothly rising and falling RF pulse in which undesired frequencies are minimized.

A further object of the invention is to provide a radio frequency pulse transmitter which operates at optimum efficiency.

Other objects will be apparent from the following description when read in conjunction with the accompanying drawings.

DETAILED DESCRIPTION

Figures 1, 2:
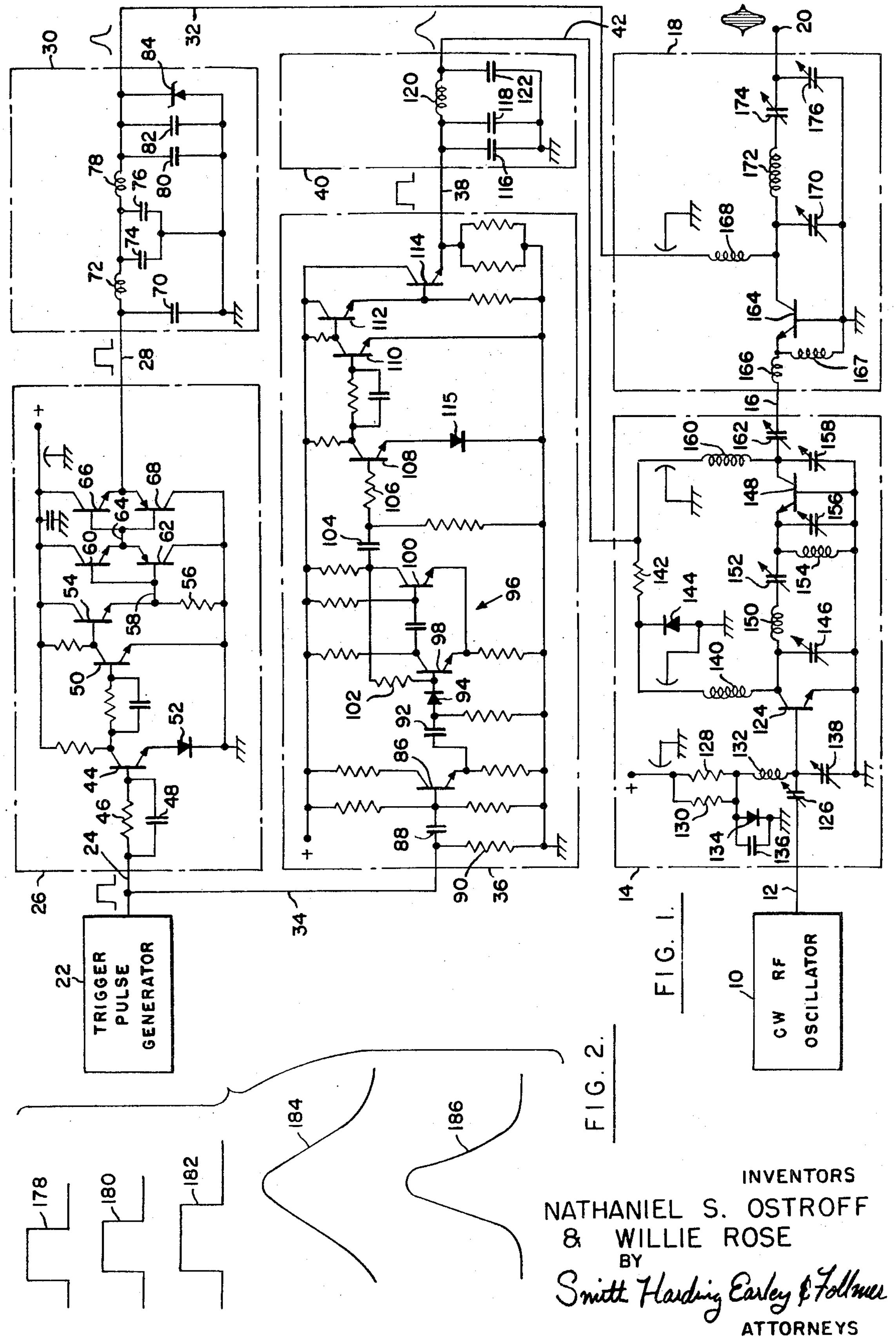
FIG. 1 is a schematic diagram of the circuitry of the radio frequency pulse transmitter in accordance with the invention.
FIG. 2 is a graphical representation showing the shapes and time relationships between the pulses at the outputs of various stages of the transmitter.

FIG. 1 shows a conventional continuous wave, radio frequency oscillator having its output connected through line 12 to an RF driver stage 14. The output of the driver stage is connected through line 16 to a final RF amplifier 18. The final RF amplifier has an output at terminal 20 which is provided for connection to an antenna.

Trigger pulse generator 22 is connected through line 24 to a primary pulse amplifier 26. The output of amplifier 26 is connected through line 28 to a primary, double stage, low-pass filter 30. The output of filter 30 is connected, through line 32, to modulate final amplifier 18. The output of trigger pulse generator 22 is also connected, through line 34, to the input of pulse stretcher and amplifier 36. The output of the pulse stretcher and amplifier is connected, through line 38, to a secondary low-pass filter 40. The output of filter 40 is connected through line 42 to modulate driver stage 14.

Primary pulse amplifier 26 comprises a plurality of cascaded amplification stages. The first stage comprises an NPN transistor 44 having its base connected through the parallel combination of resistor 46 and capacitor 48 to line 24. The output at the collector of transistor 44 is connected to a similar amplification stage comprising transistor 50. A diode 52 is connected between the emitter of transistor 44 and ground, while the emitter of transistor 50 is connected directly to ground. Diode 52 sets a minimum requirement on the level of the trigger pulse for a signal to be delivered to the base of transistor 50. The output at the collector of transistor 50 is connected directly to the base of transistor 54 which is connected in emitter-follower configuration with resistor 56 connected between its emitter and ground. The output of the emitter follower, in line 58 is connected to the base of NPN transistors 60 and PNP transistor 62. Transistors 60 and 62 are connected in complementary fashion, and provide an output in line 64 to which both emitters are connected. NPN transistor 66 and PNP transistor 68 are similarly connected in complementary fashion. Their bases are both connected to line 64, and their emitters are connected together and to line 28 to provide an amplified pulse at the input to the double section primary low-pass filter 30.

Filter 30 is made of a shunt capacitor 70 followed by a series inductor 72, shunt capacitors 74 and 76, series inductor 78 and shunt capacitors 80 and 82. A Zener diode 84 is connected between output line 32 and ground.

The pulse amplifier and stretcher circuit 36, which provides the secondary pulses for modulating the driver stage of the RF amplifier, comprises a transistor 86 connected as an emitter-follower, and receiving the input from line 34 at its base through capacitor 88. A resistor 90 is connected between line 34 and ground.

The output from the emitter of transistor 86 is connected through capacitor 92, and through diode 94 to a monostable multivibrator 96 comprising transistors 98 and 100 connected in an emitter-coupled circuit. Additional feedback is provided by resistor 102 which is connected between the collector of transistor 100 and the base of transistor 98. The time constants of the monostable multivibrator 96 are chosen with regard to the length of the trigger pulse so that the output pulse delivered from the collector of transistor 100 through capacitor 104 is slightly longer than the trigger pulse.

The pulse at the output of monostable multivibrator 96 is delivered through resistor 106 to the base of transistor 108, which, with transistors 110, 112 and 114 provides additional amplification. A diode 115 is connected between the emitter of transistor 108 and ground, in order to set a minimum requirement on the signal at the base of transistor 108.

The output of the pulse stretcher and amplifier 36 is taken from the emitter of transistor 114, and delivered through line 38 to the input of the single-section low-pass filter 40. Filter 40 comprises a shunt capacitor 116 followed by another shunt capacitor 118, a series inductor 120 and shunt capacitor 122. Its output is delivered through line 42 to the RF driver stage.

The RF driver stage 14 is made up of a pair of elementary stages connected in cascade. The first elementary stage comprises transistor 124. Its base is connected through variable capacitor 126 and line 12 to the output of the continuous wave radio frequency oscillator 10. The base of transistor 124 is biased through parallel resistors 128 and 130 connected in parallel, and choke 132 is connected in series with the resistors. The junction between the resistors and choke 132 is connected to ground through diode 134. A capacitor 136 is connected in parallel with the diode. Variable capacitor 138 is connected between the base of transistor 124 and ground, and the emitter of transistor 124 is connected directly to ground. Its collector is connected through choke 140 and resistor 142 to line 42 which carries the modulating pulse. A diode 144 is connected between ground and the junction of choke 140 and resistor 142.

The collector of transistor 124 is connected to ground through variable capacitor 146, and to the emitter of transistor 148 through inductor 150 and variable capacitor 152 connected in series.

While transistor 124 is connected in common emitter configuration, transistor 148 is connected in a common base configuration. Its emitter is connected to ground through the parallel combination of inductor 154 and variable capacitor 156. Its collector is connected to ground through variable capacitor 158, and to line 42 through choke 160.

The output from the collector of transistor 148 is delivered to the final RF amplifier 18 through variable capacitor 162 and line 16.

Amplifier 18 comprises a single transistor 164 connected in common base configuration, with its emitter connected to line 16 through inductor 166. Inductor 167 is connected between the emitter of transistor 164 and ground. The collector is connected through choke 168 to line 32 which delivers the modulating pulse. The collector is connected to ground through variable capacitor 170 and to antenna terminal 20 through inductor 172 and variable capacitor 174. A variable capacitor 176 is connected between the antenna terminal and ground.

In the operation of the circuitry as a whole, each trigger pulse 178 (FIG. 2) is amplified by primary pulse amplifier 26, and is shaped and delayed by the primary filter 30. Filter 30 produces a pulse having a gradual rise and fall and in which high frequency components are of negligible amplitude. The impedance mismatch between filter 30 and its load produces a voltage step-up which enables the final RF stage to produce peak power output. Because filter 30 comprises a pair of stages, the initiation of its output pulse 186 is substantially delayed beyond the initiation of its input pulse 180 as shown in FIG. 2. The width of pulse 186, however, is not much greater than the width of pulse 180.

The secondary pulse 182 at the output of pulse amplifier and stretcher 36, however, has a substantially longer duration than that of trigger pulse 178 because of the operation of the monostable multivibrator 96. Secondary filter 40 substantially attenuates high frequency components in pulse 182, but, since it comprises only a single section, it does not effect a delay as great as that effected by filter 30. The secondary modulating pulse 184, produced at the output of filter 40, begins prior to the beginning of pulse 186, and ends later than the end of primary pulse 186.

As a result, an RF signal sufficient to drive final amplifier 18 exists at the output of driver 14 whenever a modulating pulse for the final RF amplifier 18 exists in line 32. Consequently, the RF output pulses at the antenna terminal 20 are free of sharp rises and falls.

It will be apparent that the invention is applicable not only to airborne distance measuring equipment, but also to ground-based equipment, radar transponders, communication equipment, and wherever it is desired to produce RF pulses having a minimal content of undesired frequencies.

The invention is applicable not only in the production of pulses having smooth rises and falls such as the pulse shown at output terminal 20 in FIG. 1. It is also applicable to the production of RF pulses having more complex shapes.

It will also be apparent that numerous modifications can be made to the instrument described without departing from the invention. For example NPN and PNP transistors may be readily interchanged if appropriate modifications to the biasing circuitry are made. The necessary modifications will be obvious to persons having ordinary skill in the art. Vacuum tubes or other amplification devices may be used instead of transistors.

We claim:

1. A modulator for a multiple-stage radio-frequency pulse transmitter having a driver stage and a final amplifier stage comprising:

means responsive to a triggering signal for applying a primary modulating pulse to the final amplifier stage, means responsive to the triggering signal for applying to the driver stage a secondary modulating pulse which begins prior to and ends later than the primary modulating pulse, and shaping means for imparting a gradual rise and decay to the primary modulating pulse.

2. A modulator according to claim 1 wherein said shaping means is a low-pass filter.

3. A modulator according to claim 1 including shaping means for imparting a gradual rise and decay to the secondary modulating pulse.

4. A modulator according to claim 1 in which said means for applying a primary modulating pulse to the final amplifier stage includes means for effecting a delay from the time the triggering signal occurs to the time of initiation of the primary modulating pulse.

5. A modulator according to claim 1 in which said means for applying a primary modulating pulse to the final amplifier stage includes means for effecting a delay from the time the triggering signal occurs to the time of initiation of the primary modulating pulse, and in which said means for applying to the driver stage a secondary modulating pulse includes pulse-stretching means for receiving said triggering signal and providing an output pulse having a larger time duration than said primary modulating pulse.

6. A modulator for a multiple-stage radio-frequency pulse transmitter having a driver stage and a final amplifier stage comprising:

means for receiving a trigger pulse and for shaping and delaying said pulse to produce a primary output pulse for modulating the final amplifier stage, and means for receiving said trigger pulse and for stretching said pulse to produce a secondary output pulse for modulating the driver stage, whereby the secondary output pulse begins prior to and ends later than the primary output pulse.

7. A modulator according to claim 6 in which said means to produce a primary output pulse includes a multiple-section low-pass filter for delaying and shaping said trigger pulse.

8. A modulator according to claim 6 in which said means to produce a secondary output pulse includes a low-pass filter for shaping said trigger pulse.

9. A modulator according to claim 6 in which said means to produce a secondary output pulse includes a monostable multivibrator for stretching said trigger pulse.

10. A radio frequency pulse transmitter comprising:

radio-frequency amplifying means having a driver stage and a final amplifier stage, and means for applying a primary modulating pulse to said final amplifier stage and for applying to said driver stage a secondary modulating pulse which begins prior to and ends later than said primary modulating pulse.

11. A method for generating radio frequency pulses with undesired frequency components at relatively low levels comprising the steps of:

generating a secondary modulating pulse, generating a primary modulating pulse having a gradual rise and a gradual decay and beginning after the beginning of the secondary modulating pulse and ending before the end of the secondary modulating pulse, generating a continuous wave radio frequency signal, feeding said continuous wave signal into the input of the driver stage of a two-stage radio frequency amplifier including a driver stage and a final amplifier stage, modulating the driver stage of the two-stage radio frequency amplifier with said secondary modulating pulse, and modulating the final amplifier of said two-stage radio frequency amplifier with said primary modulating pulse.

* * * * *